United States Patent
Johnson et al.

(10) Patent No.: US 9,829,021 B2
(45) Date of Patent: Nov. 28, 2017

(54) COMPENSATION NUT FASTENER ASSEMBLY

(71) Applicant: ILLINOIS TOOL WORKS INC., Glenview, IL (US)

(72) Inventors: Lawrence W. Johnson, Taylor, MI (US); Richard Seaman, Jr., St. Clair Shores, MI (US)

(73) Assignee: Illinois Tool Works Inc., Glenview, IL (US)

( * ) Notice: Subject to any disclaimer, the term of this patent is extended or adjusted under 35 U.S.C. 154(b) by 203 days.

(21) Appl. No.: 14/758,259

(22) PCT Filed: Dec. 24, 2013

(86) PCT No.: PCT/US2013/077714
§ 371 (c)(1),
(2) Date: Jun. 29, 2015

(87) PCT Pub. No.: WO2014/107388
PCT Pub. Date: Jul. 10, 2014

(65) Prior Publication Data
US 2015/0330427 A1    Nov. 19, 2015

Related U.S. Application Data

(60) Provisional application No. 61/748,161, filed on Jan. 2, 2013.

(51) Int. Cl.
*F16B 5/02* (2006.01)
*F16B 37/04* (2006.01)

(52) U.S. Cl.
CPC ............ *F16B 5/025* (2013.01); *F16B 5/0233* (2013.01); *F16B 5/0283* (2013.01); *F16B 37/043* (2013.01)

(58) Field of Classification Search
CPC ....... F16B 5/0233; F16B 5/025; F16B 37/122
(Continued)

(56) References Cited

U.S. PATENT DOCUMENTS 5,395,194 A    3/1995    Johnson et al.
6,543,956 B2*  4/2003    Schwarzbich ........ F16B 5/0233
                                                       403/167
(Continued)

FOREIGN PATENT DOCUMENTS

DE    202007008154 U1    9/2007
EP       2532568 A2      12/2012

OTHER PUBLICATIONS

ISR and WO for PCT/US2013/077714 dated Apr. 10, 2014.

*Primary Examiner* — Flemming Saether
(74) *Attorney, Agent, or Firm* — Joseph M. Butscher; The Small Patent Law Group, LLC

(57) ABSTRACT

A compensation nut fastener assembly to connect first and second panels includes first and second nuts. The first nut includes a shaft having an outer threaded portion and a fastener-receiving channel. The first nut is connected to the first panel through the fastener, and the fastener is threadably secured to the first nut within the fastener-receiving channel. The second nut threadably retains the first nut, and includes a retaining wall having an internal threaded portion defining a central passage configured to threadably engage the outer threaded portion of the shaft of the first nut. The second nut is connected to the second panel, and the first nut is moveable within the central passage toward the first panel when the fastener threadably engages the first nut in order to compensate for a gap between the first panel and the second panel.

20 Claims, 7 Drawing Sheets

(58) Field of Classification Search
USPC .......................................................... 411/546
See application file for complete search history.

(56) References Cited

U.S. PATENT DOCUMENTS

| | | | | |
|---|---|---|---|---|
| 6,585,447 | B2* | 7/2003 | Schwarzbich | F16B 5/0233 403/299 |
| 7,488,135 | B2* | 2/2009 | Hasegawa | F16B 5/0233 403/167 |
| 8,066,465 | B2* | 11/2011 | Figge | F16B 5/025 411/34 |
| 8,764,337 | B2* | 7/2014 | Binder | F16B 5/0233 224/326 |
| 2006/0226312 | A1* | 10/2006 | Masuch | F16B 37/041 248/188 |
| 2007/0207012 | A1* | 9/2007 | Lorenzo | F16B 5/0233 411/546 |

* cited by examiner

COMPENSATION NUT FASTENER ASSEMBLY

RELATED APPLICATIONS

This application is National Phase of International Application No. PCT/US2013/077714 filed Dec. 24, 2013 and relates to and claims priority benefits from U.S. Provisional Patent Application No. 61/748,161 filed Jan. 2, 2013, which is hereby incorporated by reference in its entirety.

FIELD OF EMBODIMENTS OF THE DISCLOSURE

Embodiments of the present disclosure generally relate to fastener assemblies, and more particularly to compensation nut fastener assemblies that are configured to accommodate gaps between components, such as panels.

BACKGROUND

In various industrial applications, components are connected together through the use of fasteners. Generally, fasteners are used to connect desired components, such as panels, together. In some applications, a gap may exist between the components. For example, two panels may be separated by a clearance area or gap in which portions of other components may reside. When connecting the panels together, a fastener assembly may rattle or slip within the gap, thereby generating undesired noise and providing a loose connection.

Additionally, in various applications, fasteners may be welded to components in order to provide a secure connection between the components. Typically, however, welding may be labor and time intensive, thereby adding time and cost to a manufacturing process.

SUMMARY OF EMBODIMENTS OF THE DISCLOSURE

Certain embodiments of the present disclosure provide a compensation nut fastener assembly configured to securely connect a first panel to a second panel. The compensation nut faster assembly may include a first nut and a second nut.

The first nut may be configured to receive a fastener, and may include a shaft having an outer threaded portion and a fastener-receiving channel. The first nut may be configured to connect to the first panel through the fastener, which may be configured to threadably secure to the first nut within the fastener-receiving channel.

The second nut may be configured to threadably retain the first nut, and may include a retaining wall having an internal threaded portion defining a central passage configured to threadably engage the outer threaded portion of the shaft of the first nut. The second nut may be configured to connect to the second panel. The first nut may be configured to move within the central passage toward the first panel when the fastener threadably engages the first nut in order to compensate for a gap between the first panel and the second panel.

The compensation nut fastener assembly may also include a retaining tube. The second nut may be configured to secure to the second panel through the retaining tube. In at least one embodiment, the retaining tube may include one or more slots connected to one or more perpendicular channels extending through a terminal edge. The second nut may include one or more fixed tabs connected to one or more necks. The second nut may be configured to be rotated within the retaining tube so that the neck(s) may be trapped within the slot(s) and the tab(s) hook over outer surfaces of the retaining tube to prevent the retaining tube from outwardly flowering.

In at least one embodiment, the second nut may include opposed tube-engaging members configured to securely connect the second nut to a retaining tube. Each tube-engaging member may include a flexible root having at least one cantilevered tab extending therefrom. The cantilevered tab(s) may be configured to be retained within a reciprocal slot of the retaining tube. Each tube-engaging member may include a flange connected to the root through an extension beam. The flange is configured to be engaged to move the cantilevered tab towards the retaining wall. In at least one embodiment, the second nut may include one or more stanchions configured to be retained by one or more openings formed in the second panel.

The second nut may also include one or more retainer barbs configured to dig into a retaining tube to prevent the second nut from dislodging from the retaining tube.

The compensation nut fastener assembly may also include an O-ring between the first nut and the second nut. The O-ring is configured to prevent the first nut from disconnecting from the second nut during shipping.

Certain embodiments of the present disclosure provide a system that may include a first component, a second component, a fastener including a solid threaded shaft, and at least one compensation nut fastener assembly that securely connects the first component to the second component.

The compensation nut faster assembly may include a first nut and a second nut. The first nut receives the solid threaded shaft of the fastener, and may include a hollow shaft having an outer threaded portion and a fastener-receiving channel. The first nut connects to the first component through the fastener. The fastener threadably secures to the first nut within the fastener-receiving channel.

The second nut threadably retains the first nut, and may include a retaining wall having an internal threaded portion defining a central passage that threadably engages the outer threaded portion of the hollow shaft of the first nut. The second nut connects to the second component. The first nut moves within the central passage toward the first component when the fastener threadably engages the first nut in order to compensate for a gap between the first component and the second component.

The first component may be a vehicle frame or an instrument panel. The second component may be the other of the vehicle frame or the instrument panel.

Figure 1:
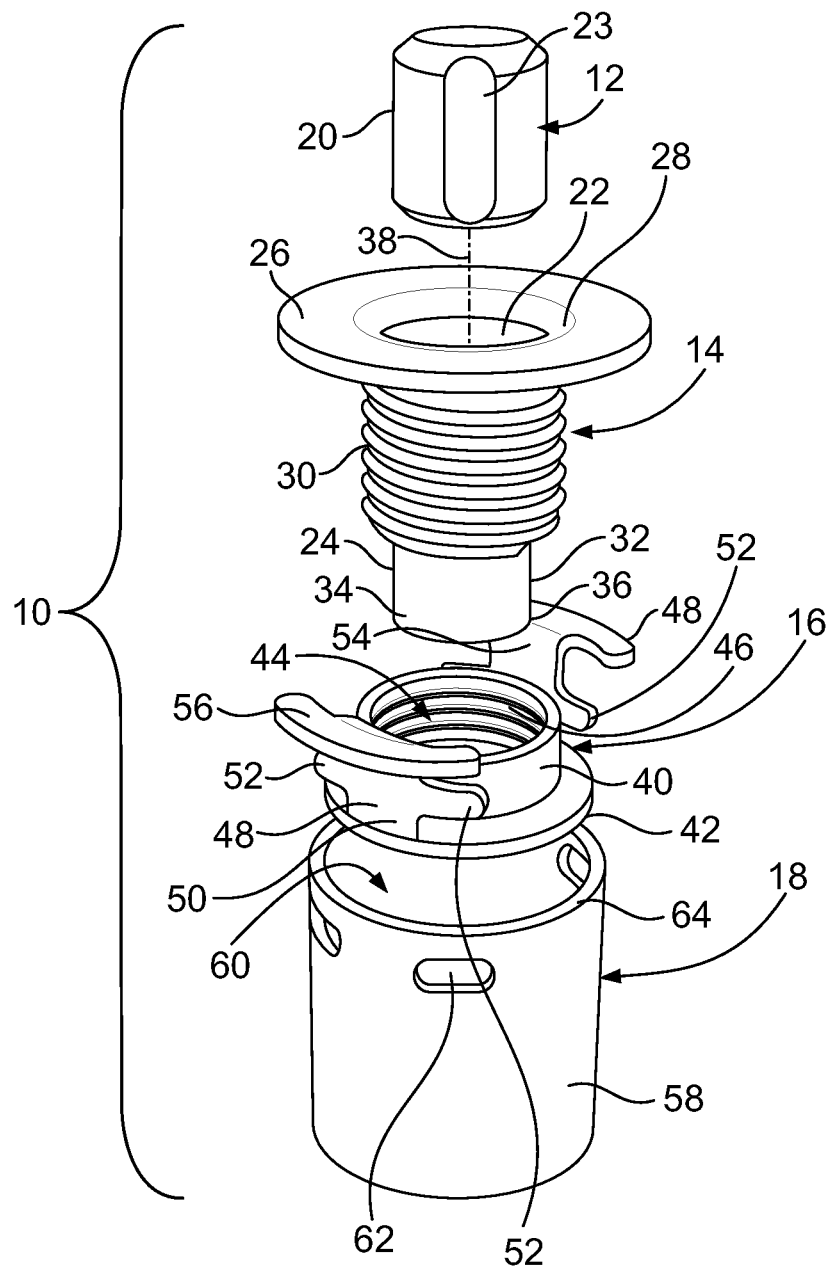
FIG. 1 illustrates a perspective exploded view of a compensation nut fastener assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide compensation nut fastener assemblies configured to be efficiently manufactured and provided to an end user. Embodiments of the present disclosure provide fastener assemblies that may quickly and easily fit in place, such as through a snap fit (in contrast to welding). Embodiments of the present disclosure provide compensation nut fastener assemblies that securely and reliably connect components together by compensating for a gap between the components.

FIG. 1 illustrates a perspective exploded view of a compensation nut fastener assembly 10, according to an embodiment of the present disclosure. The compensation nut fastener assembly 10 may include a torque clip 12, a first or male nut 14, a second or female nut 16, and a retaining tube 18. The retaining tube 18 may be a part of the compensation nut fastener assembly 10. Optionally, the retaining tube 18 may be part of a component to which the compensation nut fastener assembly 10 secures.

The torque clip 12 may include a body 20 configured to be inserted into a fastener-receiving channel 22 of the first nut 14. The main body 20 may be tubular, having one or more longitudinal recesses 23 formed therein. The torque clip 12 is configured to center and hold a fastener, such as a bolt or screw, as the fastener is inserted into the fastener-receiving channel 22. The torque clip ensures that the fastener remains in place and does not dislodge from the first nut 14. The torque clip 12 may be a plastic sleeve used to grip a fastener during an installation process. The torque clip 12 may be further described in U.S. Pat. No. 5,395,194, entitled "Convoluted Bolt Retainer," which is hereby incorporated by reference in its entirety. Alternatively, the compensation nut fastener assembly 10 may not include the torque clip 12.

The first nut 14 may be formed of metal, plastic, or the like, and includes a shaft 24 integrally connected and formed with a radial panel-abutting collar 26. The collar 26 may be a planar, annular sheet of material that outwardly and radially extends from a fastener-receiving end 28 of the shaft 24. Threads 30 may extend over an outer surface of the shaft 24 from below the collar 26 towards a fastener-passage end 32. A distal portion 34 of the fastener-passage end 32 may not be threaded. Instead, the distal portion 34 may be peened, for example. As shown in FIG. 1, the threads 30 may extend over more than half of the shaft 24. For example, the threads 30 may extend over 75% of the length of the shaft 24. Alternatively, the threads 30 may extend over more or less of the shaft 24 than shown. For example, the threads 30 may extend over an entire length of the shaft 24 from below the collar 26 to a distal tip 36.

The fastener-receiving channel 22 is formed through the first nut 14 from and through the fastener-receiving end 28 and through the distal tip 36. The fastener-receiving channel 22 longitudinally extends through the first nut 14 and may generally be centered about a longitudinal axis 38 of the first nut 14. The shaft 24 may include internal threading configured to threadably engage a fastener within the fastener-receiving channel 22. The fastener-receiving channel 22 is configured to receive the torque clip 12 and a fastener (not shown).

The second nut 16 may be formed of metal, plastic, or the like, and includes a circumferential retaining wall 40 that may connect to a lower panel-abutting collar 42 that radially extends from the retaining wall 40. The retaining wall 40 defines a central passage 44. Internal surfaces of the retaining wall 40 may include threads 46 that are configured to threadably engage the threads 30 of the first nut 14.

Opposed tube-engaging members 48 extend outwardly from the retaining wall 40. As shown, the second nut 16 may include two opposed tube-engaging members 48 spaced 180 degrees from one another. Alternatively, the second nut 16 may include more or less tube-engaging members 48 than shown. Each tube-engaging member 48 may include a root 50 extending upwardly from the lower collar 42. Protuberances, such as cantilevered tabs 52, may outwardly extend from the root 50. As shown, two mirror image tabs 52 may extend outwardly from the root 50. An extension beam 54 extends upwardly from the root 50 above the tabs 52 and connects to a radial flange 56. The flange 56 may be perpendicular to the retaining wall 40, and may be parallel with the lower collar 42.

The retaining tube 18 includes a tubular wall 58 defining a central channel 60 configured to receive the second nut 16. Reciprocal slots 62 are formed in the tubular wall 58 proximate to an upper edge 64. The reciprocal slots 62 are sized and shaped to receive and retain the cantilevered tabs 52. The number of reciprocal slots 62 may equal the number of the tabs 52 of the second nut 16. For example, the second nut 16 may include four tabs 52 and the retaining tube 18 may include four reciprocal slots 62. Alternatively, the number of reciprocal slots 62 may be greater than the number of tabs 52.

Also, alternatively, instead of cantilevered tabs, the protuberances may be various other features configured to be snapably secured within the reciprocal slots 62. For example, the protuberances may be hemispherical nubs, studs, barbs, clasps, or the like. Further, the protuberances may be spring-biased, for example.

The retaining tube 18 may be formed of metal or plastic, for example, and may be part of an instrument panel of a vehicle. Alternatively, the retaining tube 18 may be part of the assembly 10.

In operation, the second nut 16 is positioned within the retaining tube 18. In order to secure the second nut 16 within the retaining tube 18, the opposed flanges 56 are squeezed together. As the opposed flanges 56 are squeezed together, the tabs 52 also move inwardly toward the retaining wall 40. The opposed flanges 56 continue to be squeezed together until the tabs 52 are close enough to the retaining wall 40 so that they fit within the inner diameter of the retaining tube 18. The second nut 16 is then inserted into the central channel 60 of the retaining tube 18 and urged further therein until the tabs 52 encounter the reciprocal slots 62. When the tabs 52 move into alignment with the slots 62, the squeezing or compressing force is released from the opposed flanges 56, and the tabs 52 snap or flex into the slots 62. As such, the retaining tube 18 securely retains the second nut 16 within the central channel 60. In this manner, the second nut 16 is fixed in position relative to the retaining tube 18.

After the squeezing or compressing force is released from the opposed flanges 56, the opposed flanges 56 flex back to at-rest positions. Bottom surfaces of the flanges 56 may seat over the upper edge 64 of the retaining tube 18. In general, the distance between the opposed flanges 56 may be greater than the inner diameter of the retaining tube 18. Accordingly, the flanges 56 may not pass into the central channel 60. Consequently, the at-rest opposed flanges 56 may ensure that the second nut 16 remains securely centered and connected to the retaining tube 18.

The first nut 14 is aligned with the central passage 44 of the second nut 16. The threads 30 of the shaft 24 of the first nut 14 are then threadably connected to the internal threads 46 of the second nut 16. As such, the first nut 14 may be threadably secured to the second nut 16.

Alternatively, the first nut 14 may first be threadably secured to the second nut 16. Then, the second nut 16 may be secured to the retaining tube 18, as described above.

Figure 2:
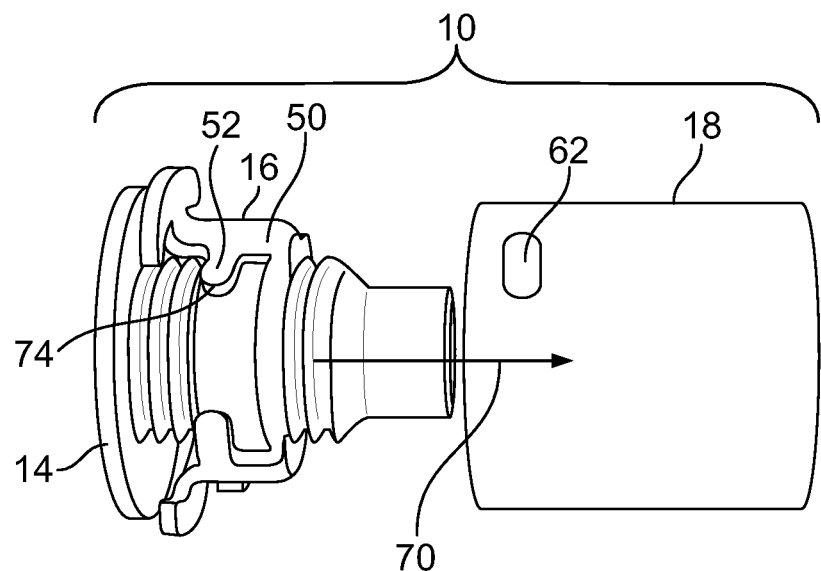
FIG. 2 illustrates a lateral view of a first and second nuts being urged into a retaining tube, according to an embodiment of the present disclosure.

FIG. 2 illustrates a lateral view of the first and second nuts 14 and 16, respectively, being urged into the retaining tube 18, according to an embodiment of the present disclosure. As shown in FIG. 2, the first nut 14 may be threadably secured to the second nut 16 before the second nut 16 is inserted into the retaining tube 18. The first and second nut 14 and 16, respectively, are urged into the retaining tube 18 in the direction of arrow 70. The cantilevered tabs 52 may snapably secure into the reciprocal slots 62 of the retaining tube 18, as described above.

Figure 3:
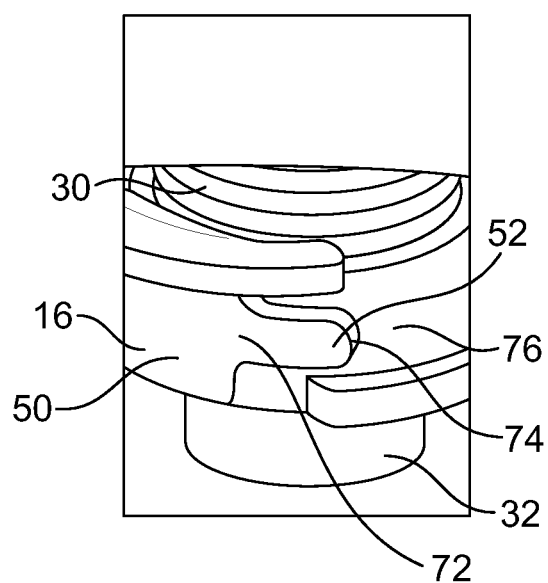
FIG. 3 illustrates a front view of a cantilevered tab of a second nut, according to an embodiment of the present disclosure.

FIG. 3 illustrates a front view of a cantilevered tab 52 of the second nut 16, according to an embodiment of the present disclosure. The tab 52 includes a pivot end 72 secured to the root 50, and a free end 74 that may flex in and out of a clearance area 76 about the pivot end 72. Referring to FIGS. 2 and 3, as the tab 52 is urged into the retaining tube 18, the free end 74 slides against an interior surface of the retaining tube 18 until the tab 52 is aligned with the slot 62. Upon being aligned with the slot 62, the free end 74 flexes or snaps outwardly into the slot 62, by way of the pivot end 72 flexing and pivoting in relation to the root 50.

Figure 4:
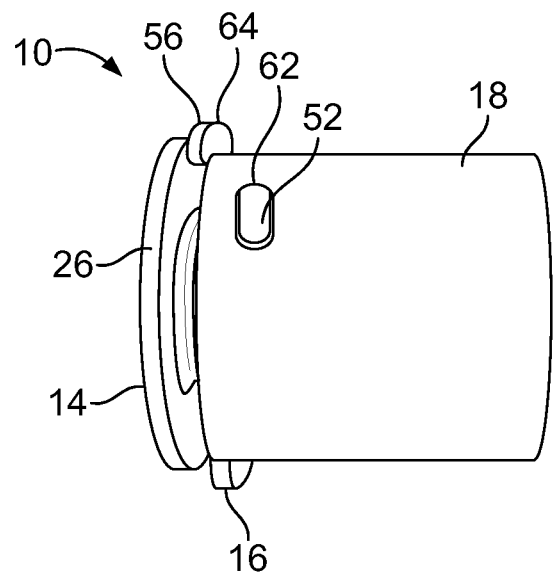
FIG. 4 illustrates a lateral view of a compensation nut fastener assembly, according to an embodiment of the present disclosure.

FIG. 4 illustrates a lateral view of the compensation nut fastener assembly 10, according to an embodiment of the present disclosure. As shown in FIG. 4, the tabs 52 of the second nut 16 are retained with the slots 62 of the retaining tube 18. The flanges 56 of the second nut 16 abut into the upper edge 64 of the retaining tube 18. The collar 26 of the first nut 14 may abut against the flanges 56 opposite from the retaining tube 18. As such, the flanges 56 may be sandwiched between the collar 26 and the upper edge 64 of the retaining tube 18.

Figure 5:
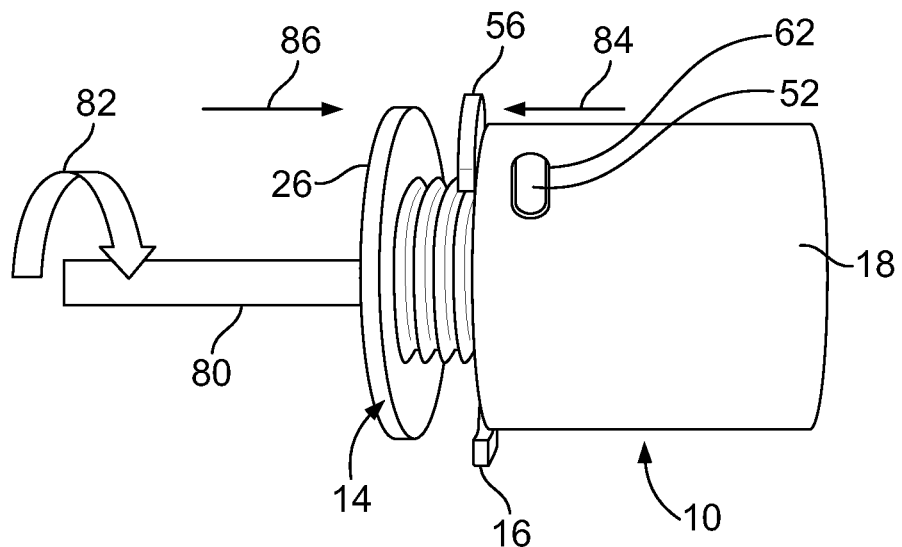
FIG. 5 illustrates a lateral view of a fastener engaging a compensation nut fastener assembly, according to an embodiment of the present disclosure.

FIG. 5 illustrates a lateral view of a fastener 80 engaging the compensation nut fastener assembly 10, according to an embodiment of the present disclosure. The fastener 80 may be a screw, bolt, or the like having a solid shaft having threads on an outer surface. The threaded shaft threadably engages the fastener-receiving channel 22 (shown in FIG. 2) of the first nut 14.

As the fastener 80 is torqued or otherwise rotated in the direction of arc 82, the fastener 80 passes through the first nut 14 while at the same time drawing the first nut 14 toward the fastener 80 in the direction of arrow 84. However, the second nut 16 is securely retained within and fixed to the retaining tube 18. The threadable engagement between the first nut 14 and the second nut 16 may be opposite to that of the fastener 80 and the first nut 14. For example, the threadable engagement between the first nut 14 and the second nut 16 may be a right-hand engagement, while the threadable engagement between the fastener 80 and the first nut 14 may be a left-hand engagement, or vice versa. As such, as the fastener 80 threadably engages the first nut 14, the rotation of the fastener 80 causes the first nut 14 to extend or move outward in the direction of arrow 84 as it rotates relative to the fastener 80, while the fastener 80 moves toward the second nut 16 in the direction of arrow 86. In this manner, a gap that may exist between a first panel connected between the head of the fastener 80 and the collar 26 and a second panel connected to the retaining tube 18 is compensated by the movement of the first nut 14 into the first panel. The compensating movement of the first nut 14 in the direction of arrow 84 securely braces the assembly 10 within the gap. As such, the assembly 10 does not rattle or shake between the first and second panels.

Figure 6:
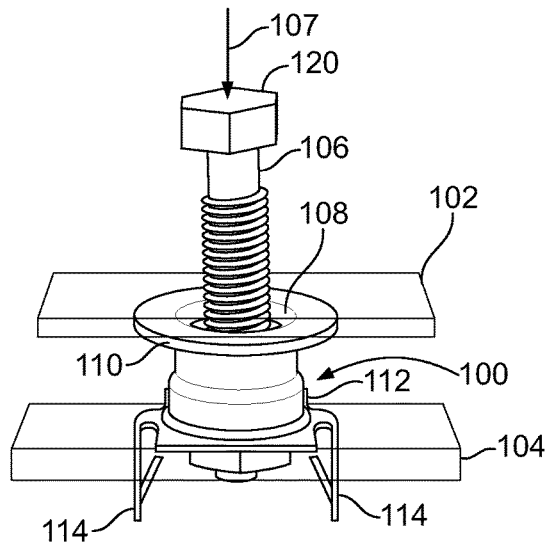
FIG. 6 illustrates a perspective view of a compensation nut fastener assembly secured between two panels in an initial position, according to an embodiment of the present disclosure.

FIG. 6 illustrates a perspective view of a compensation nut fastener assembly 100 secured between two panels 102 and 104 in an initial position, according to an embodiment of the present disclosure. As shown, the assembly 100 includes a first nut 110 and a second nut 112. The first nut 110 may be similar to the first nut described above. The second nut 112 may include panel-engaging members, such as stanchions 114, that are configured to be securely retained within reciprocal features of the panel 104. In general, the first nut 110 may threadably secure to the second nut 112 as described above. The second nut 112 may not be configured to secure into a retaining tube, as described above. Instead, the second nut 112 may directly connect to the panel 104 through the stanchions 114. Alternatively, the second nut 112 may be similar to the second nut 16 described above, and secure to a retaining tube that connects to the panel.

A fastener 106 is urged in the direction of arrow 107 into a fastener-receiving channel 108 of the first nut 110. As the fastener 106 is torqued or rotated into a securing engagement with the first nut 110, the first nut 110 is drawn toward a head 120 of the fastener 106.

Figure 7:
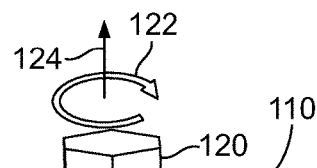
FIG. 7 illustrates a perspective view of a first nut of a compensation nut fastener assembly moving toward a first panel, according to an embodiment of the present disclosure.

FIG. 7 illustrates a perspective view of the first nut 110 of the compensation nut fastener assembly 100 moving toward the first panel 102, according to an embodiment of the present disclosure. As the fastener 106 is rotated or torqued in the direction of arc 122, the fastener 106 threadably engages the first nut 110 and passes therethrough. At the same time, the threadable engaging rotation of the fastener 106 causes the first nut 110 to move upwardly in the direction of arrow 124.

Figure 8:
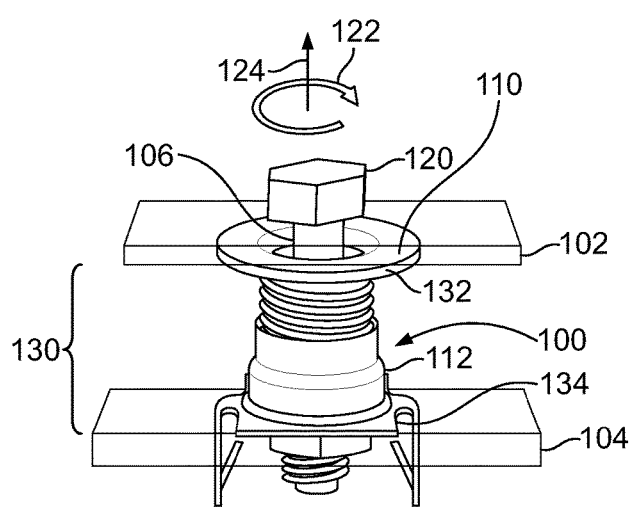
FIG. 8 illustrates a perspective view of a compensation nut fastener assembly securely bracing a first panel to a second panel, according to an embodiment of the present disclosure.

FIG. 8 illustrates a perspective view of the compensation nut fastener assembly 10 securely bracing the first panel 102 to the second panel 104, according to an embodiment of the present disclosure. As the fastener 106 continues to be torqued in the direction of arc 122, the second nut 112 remains securely fixed and stationary with respect to the panel 104. However, the first nut 110 continues to move toward the panel 102 into a bracing relationship. Accordingly, a gap 130 between the panels is securely and bracingly spanned between a collar 132 of the first nut 110 and a collar 134 of the second nut 112. Threadable engagement between the fastener 106 and the first nut 110 causes the first nut 110 to move into a bracing relationship with the panel 102, in order to securely brace the assembly 100 within the gap 130.

Figure 9:
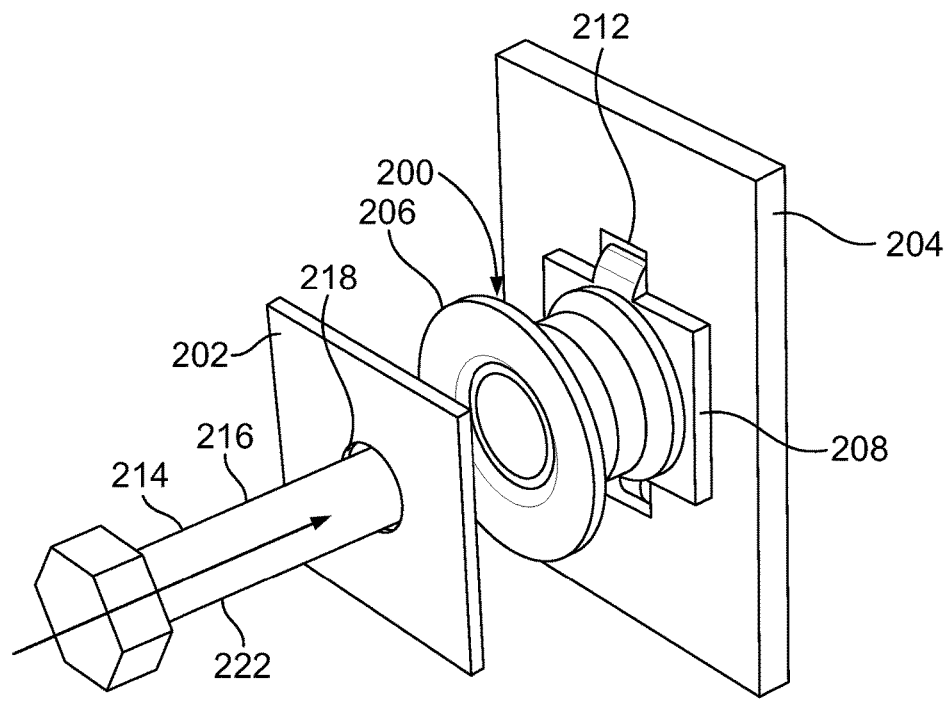
FIG. 9 illustrates a perspective front view of a compensation nut fastener assembly positioned between two panels, according to an embodiment of the present disclosure.
Figure 10:
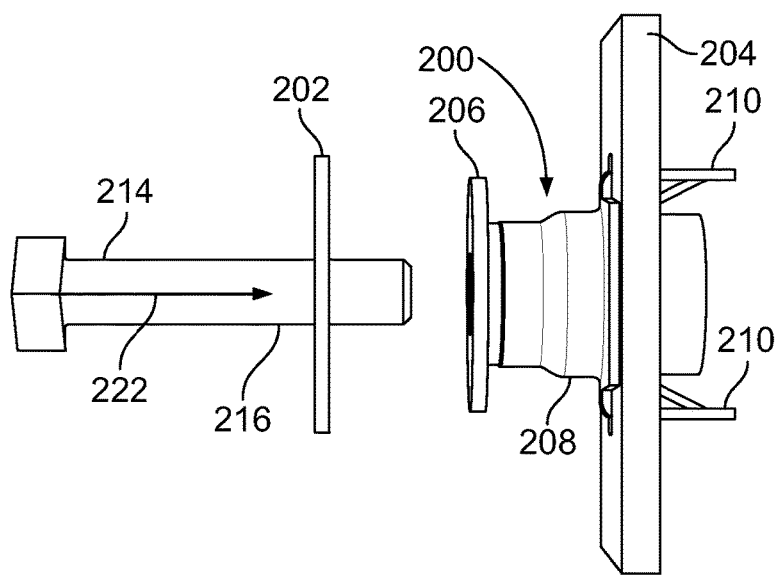
FIG. 10 illustrates a lateral view of a compensation nut fastener assembly positioned between two panels, according to an embodiment of the present disclosure.
Figure 11:
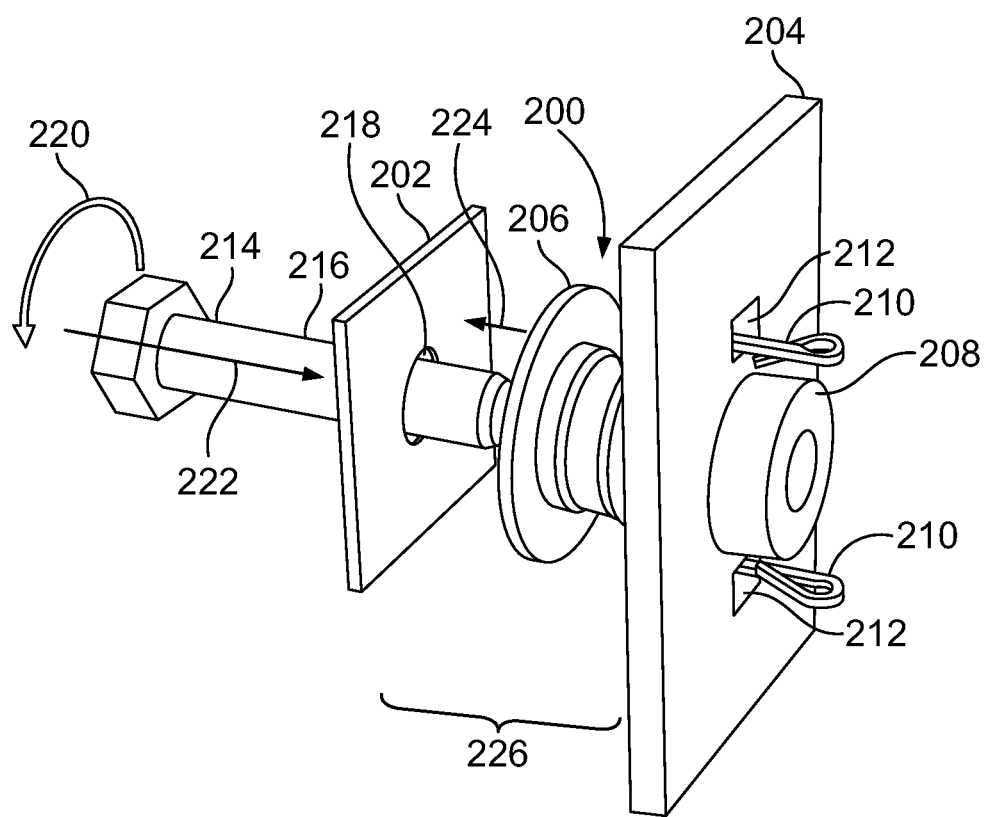
FIG. 11 illustrates a perspective rear view of a compensation nut fastener assembly positioned between two panels, according to an embodiment of the present disclosure.

FIG. 9 illustrates a perspective front view of a compensation nut fastener assembly 200 positioned between two panels 202 and 204, according to an embodiment of the present disclosure. FIG. 10 illustrates a lateral view of the compensation nut fastener assembly 200 positioned between the two panels 202 and 204, while FIG. 11 illustrates a perspective rear view of the compensation nut fastener assembly 200 positioned between the two panels 202 and 204. Referring to FIGS. 9-11, the assembly 200 may include a first nut 206 threadably secured to a second nut 208. The second nut 208 may be securely fixed to the panel 204 through one or more stanchions 210 that are securely retained within openings 212 formed through the panel 204.

A fastener 214 may include a shaft 216 inserted through a hole 218 of the panel 202. The fastener 214 threadably engages the first nut 206, as described above. As the fastener 214 is torqued in relation to the first nut 206 in the direction of arc 220, the fastener 214 moves into the assembly 200 in the direction of arrow 222. At the same time, the first nut 206 extends or otherwise moves toward the panel 202 in the direction of arrow 224, which is opposite from the direction of arrow 222. As such, the first nut 206 extends into a bracing position with the panel 202, so that the assembly 200 is securely braced within a gap 226 between the panels 202 and 204. As such, the bracing relationship of the assembly 200 within the gap 226 prevents the assembly 200 from shifting or rattling. Therefore, the panels 202 and 204 remain securely connected to one another and may not shift or move relative to one another.

Figure 12:
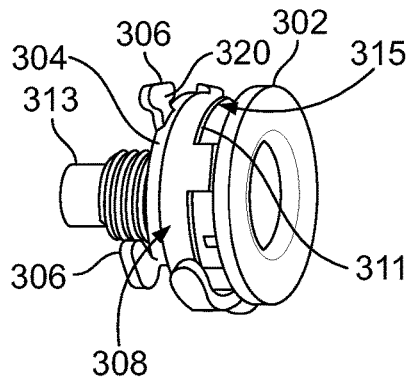
FIG. 12 illustrates a perspective lateral view of a compensation nut fastener assembly, according to an embodiment of the present disclosure.

FIG. 12 illustrates a perspective lateral view of a compensation nut fastener assembly 300, according to an embodiment of the present disclosure. The compensation nut fastener assembly 300 includes a first nut 302 threadably secured to a second nut 304. The assembly 300 is similar to the assembly 10, except that the second nut 304 may include fixed tabs 306 outwardly extending from a circumferential wall 308. Thus, the tabs 306 may not be pivoted or flexed.

Figure 13:
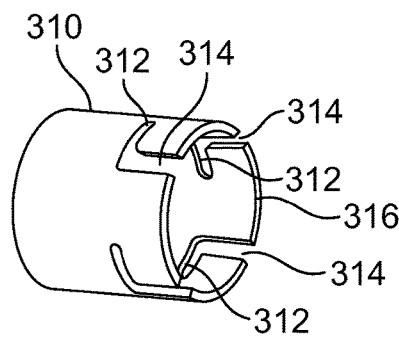
FIG. 13 illustrates a perspective lateral view of a retaining tube, according to an embodiment of the present disclosure.

FIG. 13 illustrates a perspective lateral view of a retaining tube 310, according to an embodiment of the present disclosure. The retaining tube 310 is similar to the retaining tube 18, except that it may include slots 312 connected to perpendicular channels 314 that have openings formed through an upper edge 316. Referring to FIGS. 12 and 13, in order to connect the assembly 300 to the retaining tube 310, necks 320 that connect to the tabs 306 are aligned with the channels 314. The assembly 300 is then urged into the retaining tube 310 until the necks 320 abut into internal edges that define portions of the slots 312. The assembly 300 is then rotated with respect to the retaining tube 310 so that that the necks 320 (shown in FIG. 12) are trapped within the slots 312, while the tabs 306 hook around outer portions of the circumferential wall 308, thereby assisting in retaining the outer circumference of the wall 308 (that is, helping to ensure that the circumferential wall 308 does not outwardly bow, flare, or expand).

Figure 14:
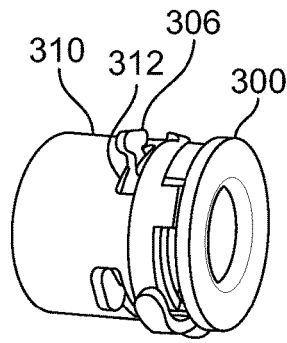
FIG. 14 illustrates a perspective lateral view of a compensation nut fastener assembly secured to a retaining tube, according to an embodiment of the present disclosure.

FIG. 14 illustrates a perspective lateral view of the compensation nut fastener assembly 300 secured to the retaining tube 310, according to an embodiment of the present disclosure. As shown in FIG. 14, the tabs 306 have been rotated into the slots 312 so that the necks 320 (shown in FIG. 12) are not aligned with the channels 314. As such, the necks 320 are trapped within the slots 312, thereby securing the assembly 300 to the retaining tube 310.

Referring to FIGS. 12-14, the retaining tube 310 may include channels having a longitudinal portion extending from an edge. The longitudinal portion connects to a perpendicular portion, thereby forming a J-shaped notch. As such, the tabs 306 on the second nut 304 may be inserted into the longitudinal portions, and rotated into the perpendicular portions.

Retainer barbs 315 extending from the second nut 304 of the assembly 300 may be configured to dig into the retaining tube 310 to prevent the assembly 300 from backing out of the retaining tube 310. For example, the barbs 315 may dig into inner surfaces of the retaining tube 310, thereby providing a secure connection therebetween.

An O-ring 311 may be configured to prevent disconnection during shipping and prevent the first nut 302 from jamming with respect to the second nut 304. The O-ring 311 creates surface friction between the first and second nuts 302 and 304, respectively, thereby preventing separation during shipment. A distal end 313 of the first nut 302 may be peened to prevent the first nut 302 from being unthreaded all the way out of the second nut 304.

The necks 320 and the tabs 306 provide T-shapes that hook over outer portions of the retaining tube 310. As such, the T-shapes prevent the retaining tube 310 from outwardly bowing, flaring, and/or flowering (for example, outer portions separated by channels outwardly flaring similar to opening petals of a flower).

Figure 15:
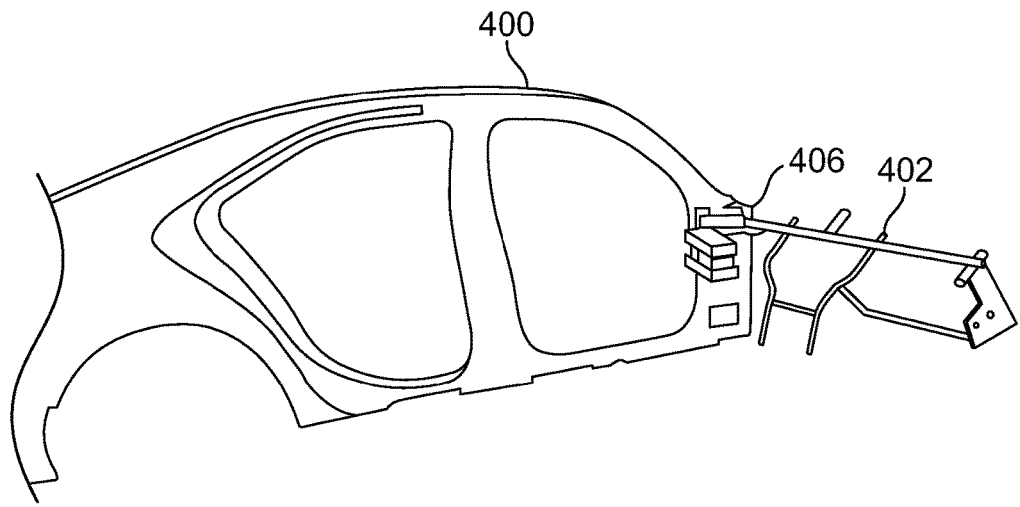
FIG. 15 illustrates a portion of a vehicle frame secured to a portion of an instrument panel, according to an embodiment of the present disclosure.

FIG. 15 illustrates a portion of a vehicle frame 400 secured to a portion of an instrument panel 402, according to an embodiment of the present disclosure. The instrument panel 402 may be secured to the vehicle frame 400 at joints 406 through the use of any of the compensation nut fastener assemblies described above. For example, the compensation nut fastener assemblies may be bracingly secured within gaps between panel portions of the vehicle frame 400 and the instrument panel 402, as described above.

Referring to FIGS. 1-15, the first, male or top nut compensates for a gap between panels, such as an instrument panel and a vehicle pillar. For example, the first nut extends or longitudinally outwardly moves when threadably engaged by a fastener in order to securely accommodate the gap between the panels. In general, there may be a gap between an instrument panel and a vehicle pillar that is configured to allow the instrument panel to be installed. The gap may vary greatly due to manufacturing deviations. The extension of the first nut occupies the gap, thereby providing a secure and reliable bracing connection.

A fastener may be initially urged into a torque clip within the fastener-receiving channel of the first nut. Next, the fastener may be rotated or torqued until the gap between the panels is occupied by the first nut. That is, as the fastener is torqued, the first nut rotates relative to the second nut, which may or may not be secured within a retaining tube, and moves toward the panel, thereby occupying, or compensating for, the gap. The panels may remain fixed with respect to one another, but the first nut moves toward one of the panels, in order to occupy the gap therebetween.

While the first nut is described as moving in relation to the second nut, which may be fixed to a retainer tube or panel, it is to be understood that the relationship between first and second nuts may be altered. For example, the first nut may be fixed to a retainer tube and/or panel, while the second nut is configured to move in relation to the first nut when a fastener is inserted into one or both of the first and second nuts and torqued into a threadable engagement therewith. Moreover, it is to be understood that the terms "first" and "second" are merely used to indicate the number of nuts, and are in no way meant to limit such nuts to any specific embodiment shown and described in the present application.

Embodiments of the present disclosure may be used with respect to various applications, such as with respect to instrument panels, sunroofs, front end modules, and the like, of vehicles, and/or various other structures, components, and/or the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

Various features of the disclosure are set forth in the following claims.

The invention claimed is:

1. A compensation nut fastener assembly configured to securely connect a first panel to a second panel, the compensation nut faster assembly comprising:

a first nut configured to receive a fastener, wherein the first nut includes a shaft having an outer threaded portion and a fastener-receiving channel, wherein the first nut is configured to connect to the first panel through the fastener, and wherein the fastener is configured to threadably secure to the first nut within the fastener-receiving channel; and a second nut configured to threadably retain the first nut, wherein the second nut includes a retaining wall having an internal threaded portion defining a central passage configured to threadably engage the outer threaded portion of the shaft of the first nut, wherein the second nut is configured to connect to the second panel, and wherein the first nut is configured to move within the central passage toward the first panel when the fastener threadably engages the first nut in order to compensate for a gap between the first panel and the second panel, wherein the second nut further comprises at least one tube-engaging member outwardly extending from a retaining wall, wherein the at least one tube-engaging member is configured to securely connect the second nut to a retaining tube, and wherein the at least one tube-engaging member comprises at least one cantilevered tab that is configured to be retained within at least one reciprocal opening of the retaining tube.

2. The compensation nut fastener assembly of claim 1, further comprising the retaining tube, wherein the second nut is configured to secure to the second panel through the retaining tube.

3. The compensation nut fastener assembly of claim 2, wherein the at least one reciprocal opening comprises one or more slots connected to one or more perpendicular channels extending through a terminal edge.

4. The compensation nut fastener assembly of claim 3, wherein the at least one cantilevered tab comprises one or more fixed tabs connected to one or more necks, wherein the second nut is configured to be rotated within the retaining tube so that the one or more necks are trapped within the one or more slots and the one or more fixed tabs hook over outer surfaces of the retaining tube to prevent the retaining tube from outwardly flowering.

5. The compensation nut fastener assembly of claim 1, wherein the at least one tube-engaging member comprises opposed tube-engaging members.

6. The compensation nut fastener assembly of claim 5, wherein each tube-engaging member comprises a flexible root having the at least one cantilevered tab extending therefrom, wherein the at least one reciprocal opening includes a reciprocal slot, and wherein the at least one cantilevered tab is configured to be retained within the reciprocal slot of the retaining tube.

7. The compensation nut fastener assembly of claim 6, wherein each tube-engaging member further comprises a flange connected to the root through an extension beam, wherein the flange is configured to be engaged to move the at least one cantilevered tab towards the retaining wall.

8. The compensation nut fastener assembly of claim 1, wherein the second nut further comprises one or more stanchions configured to be retained by one or more openings formed in the second panel.

9. The compensation nut fastener assembly of claim 1, wherein the second nut further comprises one or more retainer barbs configured to dig into a retaining tube to prevent the second nut from dislodging from the retaining tube.

10. The compensation nut fastener assembly of claim 1, further comprising an O-ring between the first nut and the second nut, wherein the O-ring is configured to prevent the first nut from disconnecting from the second nut during shipping.

11. A system comprising:
a first component;
a second component;
a fastener including a solid threaded shaft; and
at least one compensation nut fastener assembly that securely connects the first component to the second component, the at least one compensation nut faster assembly comprising:
 a first nut that receives the solid threaded shaft of the fastener, wherein the first nut includes a hollow shaft having an outer threaded portion and a fastener-receiving channel, wherein the first nut connects to the first component through the fastener, and wherein the fastener threadably secures to the first nut within the fastener-receiving channel; and
 a second nut that threadably retains the first nut, wherein the second nut includes a retaining wall having an internal threaded portion defining a central passage that threadably engages the outer threaded portion of the hollow shaft of the first nut, wherein the second nut connects to the second component, and wherein the first nut moves within the central passage toward the first component when the fastener threadably engages the first nut in order to compensate for a gap between the first component and the second component, wherein the second nut further comprises opposed tube-engaging members that securely connect the second nut to a retaining tube, wherein the second nut further comprises at least one tube-engaging member outwardly extending from a retaining wall, wherein the at least one tube-engaging member is configured to securely connect the second nut to a retaining tube, and wherein the at least one tube-engaging member comprises at least one cantilevered tab that is configured to be retained within at least one reciprocal opening of the retaining tube.

12. The system of claim 11, wherein the compensation nut fastener assembly further comprises the retaining tube, wherein the second nut secures to the second component through the retaining tube.

13. The system of claim 12, wherein the at least one reciprocal opening comprises one or more slots connected to one or more perpendicular channels extending through a terminal edge, wherein the at least one cantilevered tab comprises one or more fixed tabs connected to one or more necks, wherein the second nut is configured to be rotated within the retaining tube so that the one or more necks are trapped within the one or more slots and the one or more fixed tabs hook over outer surfaces of the retaining tube to prevent the retaining tube from outwardly flowering.

14. The system of claim 11, wherein the at least one tube-engaging member comprises opposed tube-engaging members.

15. The system of claim 14, wherein each tube-engaging member comprises a flexible root having the at least one cantilevered tab extending therefrom, wherein the at least one reciprocal opening includes a reciprocal slot, and wherein the at least one cantilevered tab is retained within the reciprocal slot of the retaining tube.

16. The system of claim 15, wherein each tube-engaging member further comprises a flange connected to the root through an extension beam, wherein the flange is configured to be engaged to move the at least one cantilevered tab towards the retaining wall.

17. The system of claim 11, wherein the second nut further comprises one or more stanchions configured to be retained by one or more openings formed in the second component.

18. The system of claim 11, wherein the second nut further comprises one or more retainer barbs that dig into a retaining tube to prevent the second nut from dislodging from the retaining tube.

19. The system of claim 11, wherein the compensation nut fastener assembly further comprises an O-ring between the first nut and the second nut, wherein the O-ring is configured to prevent the first nut from disconnecting from the second nut during shipping.

20. The system of claim 11, wherein the first component comprises one of a vehicle frame or an instrument panel, and wherein the second component comprises the other of the vehicle frame or the instrument panel.

* * * * *